(12) United States Patent
Lee

(10) Patent No.: US 9,290,685 B2
(45) Date of Patent: Mar. 22, 2016

(54) COMPOSITION FOR A REFRIGERATOR GASKET

(71) Applicant: FINE CHEMICAL CO., LTD., Gimhae-si, Gyeongsangnam-do (KR)

(72) Inventor: Sung Yull Lee, Busan (KR)

(73) Assignee: FINE CHEMICAL CO., LTD., Gyeongsangnam-Do (KR)

( * ) Notice: Subject to any disclaimer, the term of this patent is extended or adjusted under 35 U.S.C. 154(b) by 0 days.

(21) Appl. No.: 14/025,815

(22) Filed: Sep. 12, 2013

(65) Prior Publication Data

US 2014/0070131 A1    Mar. 13, 2014

(30) Foreign Application Priority Data

Sep. 12, 2012  (KR) ................ 10-2012-0100804

(51) Int. Cl.
| | | |
|---|---|---|
| *C09K 3/00* | (2006.01) | |
| *C08L 53/02* | (2006.01) | |
| *C08L 19/00* | (2006.01) | |
| *C08L 23/04* | (2006.01) | |
| *C09K 3/10* | (2006.01) | |
| *C08L 23/08* | (2006.01) | |

(52) U.S. Cl.
CPC ........... *C09K 3/1006* (2013.01); *C08L 23/0815* (2013.01); *C09K 3/10* (2013.01); *C09K 2200/062* (2013.01); *C09K 2200/0617* (2013.01); *C09K 2200/0632* (2013.01); *C09K 2200/0642* (2013.01)

(58) Field of Classification Search
USPC ................................. 525/89, 95, 98
See application file for complete search history.

(56) References Cited

U.S. PATENT DOCUMENTS

| | | | |
|---|---|---|---|
| 2005/0223646 A1* | 10/2005 | Kim ........................... | 49/478.1 |
| 2007/0216272 A1* | 9/2007 | Park ........................... | 312/405 |
| 2010/0055358 A1* | 3/2010 | Weaver et al. .................. | 428/17 |

FOREIGN PATENT DOCUMENTS

| | | |
|---|---|---|
| JP | 2000-017142 | 1/2000 |
| KR | 10-2003-0042229 A | 5/2003 |
| KR | 10-0822678 B | 4/2008 |

* cited by examiner

*Primary Examiner* — Jeffrey Mullis
(74) *Attorney, Agent, or Firm* — Revolution IP, PLLC

(57) ABSTRACT

A composition for a refrigerator gasket is provided. The composition includes, as a polymer base, a blend of an olefin/α-olefin (OAO) copolymer having a melting point of at least 100° C. and a styrene block copolymer (SBC). The polymer base has a melt index (190° C., 5 kg) of 0.01 to 15 g/10 min.

3 Claims, No Drawings

COMPOSITION FOR A REFRIGERATOR GASKET

CROSS REFERENCE TO PRIOR APPLICATIONS

This application claims priority under 35 U.S.C. §119 to Korean Patent Application No. 10-2012-0100804, filed on Sep. 12, 2012, which is hereby incorporated by reference in its entirety.

FIELD OF THE DISCLOSURE

The present disclosure relates to compositions for a refrigerator gasket.

BACKGROUND

A refrigerator gasket is currently produced by profile extrusion of a composition including a soft polyvinyl chloride (PVC) resin and additives such as a filler and a stabilizer. A defined length of a rubber magnet in the form of a strip is inserted into and thermally bonded to the gasket. The rubber magnet is made by extruding and magnetizing a mixture of rubber and ferrite.

Dioxins can be produced when polyvinyl chloride (PVC) resins are burned. Plasticizers are used to process polyvinyl chloride resins and act as environmental hormones. Particularly, plasticizers cause problems when used in resin products that are most likely to come in frequent contact with food. Many efforts have been made to replace PVC with new materials for the production of refrigerator gaskets and are described, for example, in Korean Patent Publication No. 2003-0042229 and Japanese Patent Publication No. 2000-017142.

However, resins other than polyvinyl chloride resins are difficult to apply to profile extrusion and lose elasticity over a long period. Other problems are insufficient durability and surface adhesion. These problems make it difficult to find new resins as substitutes for polyvinyl chloride resins in the field of refrigerator gaskets.

SUMMARY

One aspect of the present disclosure provides a composition for a refrigerator gasket which includes, as a polymer base, a blend of an olefin/α-olefin (OAO) copolymer having a melting point of at least 100° C. and a styrene block copolymer (SBC) wherein the polymer base has a melt index (190° C., 5 kg) of 0.01 to 15 g/10 min.

A further aspect of the present disclosure provides a composition for a refrigerator gasket which includes, as a polymer base, a blend of an olefin random copolymer (ORC), an olefin block copolymer (OBC), and a styrene block copolymer (SBC) wherein the polymer base has a melt index (190° C., 5 kg) of 0.01 to 15 g/10 min.

Another aspect of the present disclosure provides a refrigerator gasket which includes, as a polymer base, a blend of an olefin/α-olefin (OAO) copolymer and a styrene block copolymer (SBC) wherein the polymer base has a melt index (190° C., 5 kg) of 0.01 to 15 g/10 min and a Shore A hardness of 60 to 80.

DETAILED DESCRIPTION

The present disclosure will now be described in more detail.

As described above, it was difficult to find new soft materials for refrigerator gaskets as substitutes for PVC that can be subjected to profile extrusion and have a Shore A hardness of 60 to 80. There are many difficulties in using ethylene copolymers such as EVA, EMA, EBA, and POE, and thermoplastic rubbers such as SBCs SBS, SEBS, and SEPS), 12-PB, TPU, and TPEE as soft materials for use in refrigerator gaskets. Some of them have Shore A hardness values of 60 to 80 but are melted at low temperatures. The materials extruded through dies during extrusion are slowly solidified, and as a result, the products are likely to deform (e.g., distort), making the extrusion operation difficult to carry out. Meanwhile, some materials can be extruded due to their high melting points but should be mixed with softeners such as process oil to reduce their high hardness. However, the softeners cause loss of elasticity in the products and tend to ooze from the product surfaces, rendering the products sticky. Further, the adhesiveness of the materials is not satisfactory when the corners of the materials are melt-adhered. For example, the materials are not readily or strongly adhered to refrigerators, and as a result, they may be detached from the refrigerators during use. Such side effects are obstacles to the commercialization of the materials.

Thus, the present disclosure provides a novel composition for a refrigerator gasket. The composition of the present disclosure may include, as a polymer base, a blend of an olefin/α-olefin (OAO) copolymer and a styrene block copolymer (SBC).

The melting point of the olefin/α-olefin copolymer is at least 100° C. and the melt index (MI, 190° C., 5 kg) of the composition is from 0.01 to 15.0 g/10 min. Within these ranges, the composition of the present disclosure is suitable for use in a refrigerator gasket.

The term "olefin/α-olefin copolymer" used herein generally refers to a copolymer including ethylene or propylene and an α-olefin having two or more carbon atoms. The α-olefin is an olefin consisting of at least two carbon atoms and having a terminal carbon-carbon double bond.

Preferably, ethylene or propylene makes up the largest mole fraction of the polymer. Specifically, ethylene or propylene accounts for about 50 mole % or more of the polymer. More preferably, ethylene or propylene accounts for about 60 mole % or more, about 70 mole % or more or about 80 mole % or more of the polymer. The substantial remainder of the polymer includes one or more other comonomers. The comonomers are preferably α-olefins having three or more carbon atoms. The olefin/α-olefin copolymer may be an ethylene/octene copolymer. In this case, the polymer includes about 80 mole % or more of ethylene and about 10 to about 15 mole %, preferably about 15 to about 20 mole % of octene.

The olefin/α-olefin copolymer may be a random or block copolymer. Representative examples of OAO copolymers include ethylene alpha olefin (EAO) copolymers and propylene alpha olefin (PAO) copolymers. Many products are commercially available for the olefin/α-olefin copolymer. Suitable EAO copolymers include ENGAGE and INFUSE from Dow Chemical, TAFMER from Mitsui, EXACT from Exxon Mobile, and LG-POE from LG Chem. Suitable PAO copolymers include VERSIFY from Dow Chemical, NOTIO from Mitsui, and VISTAMAXX from Exxon Mobile. Most of these commercial products cannot be used for profile extrusion due to their low melting points and only some of them can be extruded due to their high melting points of 100° C. or above. However, most extrudable OAO copolymers have high hardness, which makes it difficult to use them for refrigerator gaskets. For use in refrigerator gaskets, OAO copolymers are blended with other materials. This blending is needed to achieve low hardness and to satisfy the viscosity of molten resins necessary for profile extrusion. OAO copolymers as materials for refrigerator gaskets are required to maintain air-tightness of the gaskets even when the gaskets are opened and closed ten to hundred thousand times. To meet this requirement, the elasticity of OAO copolymers should be considerably high. The present inventors have found that the use of a styrene block copolymer (SBC) can simultaneously meet the three requirements, i.e. low hardness, high elasticity, and high extrusion viscosity, and can ensure sufficient melt adhesiveness. The invention has been accomplished based on this finding.

If the SBC has a melt index (MI, 190° C., 2.16 kg) of 5.0 g/10 min or more, the melt index (MI) of the blend with the OAO copolymer increases excessively and profile extrusion of the blend is thus impossible. The MI (190° C., 2.16 kg) of the SBC is preferably limited to less than 5.0 g/10 min, more preferably to less than 2.0 g/10 min.

A lubricant such as stearic acid or ethylene bis stearamide may be used to improve the workability of the final blend. A filler such as silica ($SiO_2$), $MgCO_3$, $CaCO_3$, talc, $Al(OH)_3$ or $Mg(OH)_2$ may also be used to lower the MI of the blend or increase the viscosity of the blend.

The polymer base may further include an ethylene copolymer (for example, EVA, EEA, EMA, EBA, ENMMA or POE) or a thermoplastic rubber (for example, 12-PB, TPU, TPEE, TPV or CPE), in addition to the OAO and SBC.

The MI (190° C., 5 kg) of the final composition is typically from 0.01 to 15.0 g/10 min, preferably from 1.0 to 10.0 g/10 min, more preferably 1.0 to 7.0 g/10 min. If the MI (190° C., 5 kg) of the final composition is lower than 0.01 g/10 min, too high a pressure is applied to an extruder, resulting in an increased danger of damage to the machine. Further, since a very small amount of the composition is extruded, it is time consuming to produce the desired product, which is economically disadvantageous. Meanwhile, if the MI (190° C., 5 kg) of the final composition exceeds 15 g/10 min, the viscosity of the blend extruded through a die of an extruder is low, resulting in deformation (e.g., distortion) of the product. Accordingly, it is impossible to obtain a desired shape of the product.

The OAO and SBC are used in a weight ratio of 10:90 to 90:10, preferably, 15:85 to 85:15, more preferably 20:80 to 80:20, even more preferably 30:70 to 70:30. If the OAO proportion is less than 10 and the SBC proportion exceeds 90, the surface of the final product becomes sticky and cooling is retarded during corner adhesion, resulting in poor adhesion workability. Meanwhile, if the OAO proportion exceeds 90 and the SBC proportion is less than 10, the MI of the composition increases, resulting in poor extrusion workability. Further, the elasticity of the product is insufficient, the shape of the product is not maintained during long-term use, and the deformation of the product is apt to occur.

In one embodiment, the olefin/α-olefin copolymer used in the composition of the present disclosure is an olefin random copolymer (ORC).

The olefin random copolymer may be a random copolymer of ethylene or propylene and at least one copolymerizable α-olefin comonomer.

The ORC may be a copolymer of ethylene and an α-olefin, i.e. an EAO copolymer. In this case, the ORC may contain at least one copolymer of a $C_3$-$C_{20}$ α-olefin, a $C_3$-$C_{12}$ α-olefin, or a $C_3$-$C_8$ α-olefin. A suitable α-olefin may be straight chained or branched (for example, substituted with at least one $C_1$-$C_3$ alkyl or aryl group). Specific examples of such α-olefins include propylene, butene, 3-methyl-1-butene, 3,3-dimethyl-1-butene, pentene, pentene substituted with at least one methyl, ethyl or propyl group, hexene substituted with at least one methyl, ethyl or propyl group, heptene substituted with at least one methyl, ethyl or propyl group, octene substituted with at least one methyl, ethyl or propyl group, nonene substituted with at least one methyl, ethyl or propyl group, decene substituted with at least one ethyl, methyl or dimethyl group, dodecene substituted with at least one ethyl, methyl or dimethyl group, and styrene substituted with at least one ethyl, methyl or dimethyl group. Particularly preferred α-olefin comonomers are propylene, butene (e.g., 1-butene), hexene, and octene (e.g., 1-octene or 2-octene). The ethylene content of the copolymer may be from about 60 mole % to about 99.5 mole %. In some embodiments, the ethylene content may be from about 80 mole % to about 99 mole %. In some embodiments, the ethylene content may be from about 85 mole % to about 98 mole %. Accordingly, the α-olefin content of the copolymer may be limited to the range of about 0.5 mole % to about 40 mole %. In some embodiments, the α-olefin content may be limited to the range of about 1 mole % to about 20 mole %. In some embodiments, the α-olefin content may be limited to the range of about 2 mole % to about 15 mole %. The distribution of the α-olefin comonomer is typically random and is uniform over different molecular weight fractions of the monomers constituting the ethylene copolymer.

The ORC may be a copolymer of propylene and an α-olefin, i.e. a PAO copolymer. In this case, the ORC may contain at least one copolymer of a $C_2$-$C_{20}$ α-olefin, a $C_2$-$C_{12}$ α-olefin, or a $C_2$-$C_8$ α-olefin. A suitable α-olefin may be straight chained or branched (for example, substituted with at least one $C_1$-$C_3$ alkyl or aryl group). Specific examples of such α-olefins include ethylene, butene, 3-methyl-1-butene, 3,3-dimethyl-1-butene, pentene, pentene substituted with at least one methyl, ethyl or propyl group, hexene substituted with at least one methyl, ethyl or propyl group, heptene substituted with at least one methyl, ethyl or propyl group, octene substituted with at least one methyl, ethyl or propyl group, nonene substituted with at least one methyl, ethyl or propyl group, decene substituted with at least one ethyl, methyl or dimethyl group, dodecene substituted with at least one ethyl, methyl or dimethyl group, and styrene substituted with at least one ethyl, methyl or dimethyl group. Particularly preferred α-olefin comonomers are ethylene, butene (e.g., 1-butene), hexene, and octene (e.g., 1-octene or 2-octene). The propylene content of the copolymer may be from about 60 mole % to about 99.5 mole %. In some embodiments, the propylene content may be from about 80 mole % to about 99 mole %. In some embodiments, the propylene content may be from about 85 mole % to about 98 mole %. Accordingly, the α-olefin content of the copolymer may be limited to the range of about 0.5 mole % to about 40 mole %. In some embodiments, the α-olefin content may be limited to the range of about 1 mole % to about 20 mole %. In some embodiments, the α-olefin content may be limited to the range of about 2 mole % to about 15 mole %. The distribution of the α-olefin comonomer is typically random and is uniform over different molecular weight fractions of the monomers constituting the propylene copolymer.

The density of the ethylene/α-olefin (EAO) copolymer or propylene/α-olefin (PAO) copolymer may be a function of the length and amount of the α-olefin. That is, as the chain length and amount of the α-olefin increases, the density of the copolymer decreases. Generally, the copolymer can better retain a three-dimensional structure at a higher density and can have better elastomeric properties as a lower density.

The ORC may have a density of about 0.86 to about 0.90 g/cc. In some embodiment, the ORC may have a density of about 0.861 to about 0.89 g/cc. In some embodiment, the ORC may have a density of about 0.862 to about 0.88 g/cc.

In one embodiment, the olefin/α-olefin copolymer used in the composition of the present disclosure may be an olefin block copolymer (OBC).

The olefin block copolymer (OBC) is a multi-block copolymer. The multi-block copolymer refers to a polymer including two or more chemically distinct zones or segments (also called "blocks") that are preferably bonded in a linear configuration, i.e. a polymer including chemically distinguished units that are bonded end-to-end to polymerized ethylenic or propylenic functional groups rather than in a pendant or graft configuration.

The olefin block copolymer (OBC) refers to an ethylene/α-olefin multi-block copolymer or a propylene/α-olefin multi-block copolymer. The olefin block copolymer is a copolymer of ethylene or propylene and one or more copolymerizable α-olefin comonomers. The olefin block copolymer is characterized by being a multi-block copolymer having a plurality of blocks or segments of two or more polymerized monomer units having different chemical or physical properties. The contents of the olefin and the α-olefin in the OBC are the same as those explained for the ORC.

In some embodiments, the multi-block copolymer may be represented by the following Formula:

$$(AB)n$$

wherein n is an integer of at least 1, preferably an integer greater than 1, for example, 2, 3, 4, 5, 10, 15, 20, 30, 40, 50, 60, 70, 80, 90, 100 or higher; A represents a hard block or segment; and B represents a soft block or segment. Preferably, A and B are linked in a linear configuration rather than in a branched or star configuration. The hard segment refers to a block of polymerized units in which ethylene or propylene is present in a particular amount. In some embodiments, the ethylene or propylene content of the hard segment is 95% by weight or more. In further embodiments, the ethylene or propylene content of the hard segment is 98% by weight or more. That is, in some embodiments, the content of the comonomers in the hard segment is not greater than 5% by weight. In further embodiments, the content of the comonomers in the hard segment is not greater than 2% by weight. In some embodiments, the hard segment is wholly or substantially composed of ethylene or propylene. Meanwhile, the soft segment refers to a block of polymerized units in which the comonomers are present in a particular amount. In some embodiments, the content of the comonomers in the soft segment is 5% by weight or more. In further embodiments, the content of the comonomers in the soft segment is 8% by weight or more, 10% by weight or more, or 15% by weight or more. In further embodiments, the content of the comonomers in the soft segment is 20% by weight or more, 25% by weight or more, 30% by weight or more, 35% by weight or more, 40% by weight or more, 45% by weight or more, 50% by weight or more, or 60% by weight or more.

In one embodiment, the olefin block copolymer may have a density of 0.85 to 0.91 g/cc or 0.86 to 0.88 g/cc.

In one embodiment, the olefin block copolymer may have a melt index (MI) of 0.01 to 30 g/10 minutes, 0.01 to 20 g/10 minutes, 0.1 to 10 g/10 minutes, 0.1 to 5.0 g/10 minutes, 0.1 to 1.0 g/10 minutes, or 0.3 to 0.6 g/10 minutes, as measured by ASTM D1238 (190° C., 2.16 kg).

The composition of the present disclosure is prepared by blending the styrene block copolymer (SBC) with the olefin/α-olefin (OAO) copolymer. A single use of the OAO copolymer as a polymer base component leads to low elasticity of a refrigerator gasket. In view of this, the composition of the present disclosure further includes the styrene block copolymer.

In a preferred embodiment, the olefin random copolymer (ORC) and the olefin block copolymer (OBC) as olefin/α-olefin (OAO) copolymers may be blended with the styrene block copolymer (SBC). The ORC alone may be blended with the SBC. In this case, however, the low melting point (m.p) of the ORC may deteriorate the extrusion workability of the blend and the low compression set of the ORC may deteriorate the shape retention of the blend. It may take a long time to cool the blend during corner adhesion, resulting in poor productivity. On the other hand, the OBC alone may also be blended with the SBC. In this case, however, the slightly low elasticity of the OBC may deteriorate the ability of the blend to prevent leakage of cool air from a refrigerator, leading to an increase in electricity consumption. It may take a very long time to heat the blend during corner adhesion due to the very high melting point (m.p) of the OBC, resulting in poor adhesion productivity. In conclusion, best results can be obtained when the SBC is blended with a combination of the ORC and the OBC.

In the case where the combination of the olefin random copolymer (ORC) and the olefin block copolymer (OBC) is used as the olefin/α-olefin copolymer, the weight of the olefin random copolymer (A1), the weight of the olefin block copolymer (A2), and the weight of the styrene block copolymer (A3) may satisfy the relationships of (A1+A2):A3=1:4 to 9:1 and A1:A2=1:0.5 to 1:6. The weight ratio A1:A2 is preferably from 1:0.8 to 1:5.5, more preferably from 1:1 to 1:5. If the proportion of the OBC is less than the lower limit, poor extrusion workability or shape retention may be caused. Meanwhile, if the proportion of the OBC exceeds the upper limit, insufficient elasticity may be obtained. If the proportion of the SBC in the olefin/α-olefin copolymer is too low, poor extrusion workability or shape retention may be caused. Meanwhile, if the proportion of the SBC in the olefin/α-olefin copolymer is too high, poor extrusion workability or corner adhesiveness may be caused.

The styrene block copolymer may include at least one block copolymer selected from the group consisting of styrene-butadiene-styrene (SBS) block copolymers, styrene-isoprene-styrene (SIS) block copolymers, styrene-ethylene-butadiene-styrene (SEBS) block copolymers, styrene-butylene-butadiene-styrene (SBBS) block copolymers, and styrene-ethylene-propylene-styrene (SEPS) block copolymers. More specific examples of such styrene block copolymers are described in EP 0 712 892 B1, WO 2004/041538 A1, U.S. Pat. No. 6,582,829 B1, US 2004/0087235 A1, US 2004/0122408 A1, US 2004/0122409 A1, U.S. Pat. Nos. 4,789,699, 5,093,422, and 5,332,613.

The styrene block copolymer may have at least two monoalkenyl arene blocks, preferably two polystyrene blocks separated by a block of a saturated conjugated diene including a degree of residual ethylenic unsaturation of less than 20%, preferably a saturated polybutadiene block. A branched or radial polymer or a functionalized block copolymer may be useful as the styrene block copolymer in some embodiments, but preferably the styrene block copolymer has a linear structure.

The total number average molecular weight of the styrene block copolymer having a linear structure is preferably from 30,000 to 250,000. The average polystyrene content of such a block copolymer is typically from 10% to 65% by weight, more typically from 10% to 40% by weight.

In a particular embodiment, useful are SEBS (where S is styrene, E is ethylene, and B is butylene) and SEPS (where S is styrene, E is ethylene, and P is propylene) block copolymers available from Kraton Polymers, Asahi Kasei, and Kuraray America.

In an exemplary embodiment, the composition of the present disclosure may include, as a polymer base, a blend of an ethylene-octene block copolymer and a styrene-ethylene-butylene-styrene block copolymer.

The composition of the present disclosure can be subjected to profile extrusion to produce a refrigerator gasket. The refrigerator gasket produced using the composition of the present disclosure is excellent in extrusion workability, elasticity, and corner adhesiveness. In addition, the refrigerator gasket is free from surface stickiness.

According to one embodiment, a refrigerator gasket is provided which includes, as a polymer base, a blend of an olefin/α-olefin (OAO) copolymer and a styrene block copolymer (SBC) wherein the polymer base has a melt index (190° C., 5 kg) of 0.01 to 15 g/10 min and a Shore A hardness of 60 to 80.

Preferably, the olefin/α-olefin copolymer has a melting point of 100° C. or more. As an example, a copolymer of ethylene or propylene and octene is preferred as the olefin/α-olefin copolymer.

A magnet may be included in the body of the refrigerator gasket. The magnet is preferably a rubber magnet. The rubber magnet may be in the form of a strip and may be made by extruding and magnetizing a mixture of rubber and ferrite. The magnet can facilitate sealing of a refrigerator door.

The weight ratio of the olefin/α-olefin copolymer to the styrene block copolymer is from 10:90 to 90:10, preferably from 15:85 to 85:15, more preferably from 20:80 to 80:20, even more preferably from 30:70 to 70:30. Within this range, optimum physical properties in terms of elasticity and corner adhesion can be ensured.

The present disclosure will be explained in more detail with reference to the following examples. However, these examples are not intended to limit the spirit of the present disclosure.

EXAMPLES

EAO-1: Ethylene-octene random copolymer (ENGAGE, Dow), density: 0.885 g/cc, m.p.: 77° C.
EAO-2: Ethylene-octene random copolymer (ENGAGE, Dow), density: 0.908 g/cc, m.p.: 104° C.
EAO-3: Ethylene-octene block copolymer (INFUSE, Dow), density: 0.877 g/cc, m.p.: 122° C.
EAO-4: Ethylene-octene random copolymer (ENGAGE, Dow), density: 0.865 g/cc, m.p.: 55° C.
PAO-1: Propylene-octene random copolymer (VERSIFY, Dow), density: 0.865 g/cc, m.p.: 55° C.
PAO-2: Propylene-alphaolefin random copolymer (NOTIO, Mitsui), density: 0.866 g/cc, m.p.: 135° C.
EVA-1: Ethylene vinylacetate (VA content: 26%, MI: 2.5), m.p.: 71° C.
SBC-1: Styrene ethylene butylene styrene (Styrene content: 30%, MI (190° C., 2.16 kg): 6.0)
SBC-2: Styrene ethylene butylene styrene (Styrene content: 30%, MI (190° C., 2.16 kg): 0.2)
SBC-3: Styrene ethylene butylene styrene (Styrene content: 30%, MI (230° C., 2.16 kg): 6.0)
TPU-1: Ester based TPU (Grade 5080A, Dongsung Hichem)
EVA-1: Ethylene vinyl acetate (VA 26%, MI (190° C., 2.16 kg): 2.5)

(Performance Evaluation)

1) The temperature of a cylinder in an extruder (cylinder diameter=100 mm, L/D=36:1) equipped with a die in the shape of a refrigerator gasket was adjusted to 170° C. Each of the blends of Comparative Examples 1-27 and Examples 1-13 shown in Table 1 was extruded from the extruder. The blend extruded through the die was directly passed through a chamber provided with a freezer (set to a temperature of 100° C., passage time=20 sec) to obtain a desired shape. The extrusion workability of the blend was collectively judged.

2) The surface stickiness of each blend was evaluated by a finger touch test.

3) Each blend was placed in a 2 mm thick mold, pressurized and heated at 200° C. for 5 min, and cooled in a cooling press for 5 mm to obtain a 2 mm thick specimen of the blend. The specimen was cut to a size of 2 mm (width)×100 mm (length) and a tape was attached to both ends of the specimen to make a loop. After standing for 10 min, the tape was cut. The time for the specimen to return to its original linear shape was measured. The elasticity of the blend was evaluated by grade A, B, C, D or E from the shortest to longest time.

4) Another 2 mm thick specimen of each blend was cut to a size of 10 mm (width)×100 mm (length) and bent 200,000 times using a Demattia flexing tester. The shape retention of the blend was evaluated by grade A, B, C, D or E depending on how much the specimen was deformed from its original (planar) shape.

5) Two specimens of the blend, each of which had a thickness of 5 mm and a length of 100 mm, were brought into contact with both surfaces of a double-sided heater at a temperature of 250° C. to melt the surfaces thereof. The heater was removed and the specimens were attached to each other. The specimens were detached from each other at increasing time intervals of 1, 2, 3, 4, and 5 sec. The corner adhesiveness of the blend was evaluated by grade A, B, C, D or E depending on how fast the specimens were fixed to each other.

6) The surfaces of the samples obtained in the extrusion workability test were visually observed. The surface smoothness of each sample was evaluated by grade A, B, C, D or E based on the surface state thereof.

7) The hydrolysis resistance of a 2 mm thick specimen of each blend was evaluated under accelerated test conditions. Specifically, the specimen was dipped in water at 50° C. for 7 days and dried at 50° C. for 5 hr. The hydrolysis resistance of the specimen was graded based on the following criteria: "A" when a reduction in the tensile strength of the specimen after hydrolysis was 5.0% or less, "B" when the tensile strength reduction was 5.1-10.0%, "C" when the tensile strength reduction was 10.1-15.0%, "D" when the tensile strength reduction was 15.1-20.0%, and "E" when the tensile strength reduction was 20.1-25%.

8) Each blend was irradiated with a UV-C lamp for 8 hr. The UV discoloration resistance of the blend was evaluated by grade A, B, C, D or E depending on how much the color was changed.

The results are shown in Table 1.

TABLE 1

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| EAO-1 | 100 |  |  |  |  |  |  | 50 |
| EAO-2 |  | 100 |  |  |  |  | 90 |  |

TABLE 1-continued

|  |  |  |  |  |  |  |  |  |
|---|---|---|---|---|---|---|---|---|
| EAO-3 |  | 100 |  |  |  |  |  |  |
| PAO-1 |  |  | 100 |  |  |  |  |  |
| PAO-2 |  |  |  |  | 100 |  |  |  |
| EVA-1 |  |  |  |  |  |  |  |  |
| SBC-1 |  |  |  |  |  |  |  |  |
| SBC-2 |  |  |  |  |  |  | 100 | 50 |
| Process oil |  |  |  |  |  |  | 10 |  |
| MI (190° C., 5 kg) | 31.0 | 15.0 | 15.0 | 41.0 | 11.0 | 1.0 | 25.0 | 21.0 |
| Hardness (Shore A) | 75 | 85 | 60 | 75 | 70 | 67 | 70 | 71 |
| Extrusion workability | E | B | B | E | B | A | E | D |
| Surface stickiness | A | A | A | A | A | D | E | B |
| Elasticity | B | C | B | D | B | A | D | A |
| Shape retention | C | C | C | C | C | A | E | A |
| Corner adhesiveness | C | A | A | D | A | D | E | B |
| Surface smoothness | C | C | C | C | C | B | B | B |
| Hydrolysis resistance | A | A | A | A | A | A | A | A |
| UV discoloration resistance | A | A | A | A | A | A | A | A |
| Suitability for gasket | Unsuitable | Unsuitable | Unsuitable | Unsuitable | Unsuitable | Unsuitable | Unsuitable | Unsuitable |

|  | Example 1 | Example 2 | Comparative Example 9 | Comparative Example 10 | Comparative Example 11 | Comparative Example 12 | Example 3 | Comparative Example 13 | Comparative Example 14 | Comparative Example 15 | Comparative Example 16 |
|---|---|---|---|---|---|---|---|---|---|---|---|
| EAO-1 |  |  |  |  |  |  |  |  |  |  |  |
| EAO-2 | 50 |  |  | 5 | 50 |  |  |  |  |  |  |
| EAO-3 |  | 50 | 95 |  |  |  |  |  |  |  |  |
| PAO-1 |  |  |  |  |  | 50 |  |  |  |  |  |
| PAO-2 |  |  |  |  |  |  | 50 | 95 | 5 | 50 |  |
| EVA-1 |  |  |  |  |  |  |  |  |  |  | 50 |
| SBC-1 |  |  |  |  | 50 |  |  |  |  | 50 |  |
| SBC-2 | 50 | 50 | 5 | 95 |  | 50 | 50 | 5 | 95 |  | 50 |
| Process oil |  |  |  |  |  |  |  |  |  |  |  |
| MI (190° C., 5 kg) | 6.0 | 5.5 | 12.0 | 1.0 | 18 | 26 | 4.0 | 10.0 | 2.0 | 16.0 | 27.0 |
| Hardness (Shore A) | 76 | 64 | 61 | 68 | 75 | 71 | 69 | 68 | 67 | 68 | 76 |
| Extrusion workability | A | A | B | A | C | E | A | B | A | C | E |
| Surface stickiness | A | A | A | D | A | B | A | A | D | A | A |
| Elasticity | A | B | B | A | A | A | A | B | A | A | A |
| Shape retention | A | A | C | A | A | A | A | C | A | A | A |
| Corner adhesiveness | A | A | A | D | B | B | A | A | D | B | C |
| Surface smoothness | A | A | C | A | A | A | A | C | A | A | A |
| Hydrolysis resistance | A | A | A | A | A | A | A | A | A | A | A |
| UV discoloration resistance | A | A | A | A | A | A | A | A | A | A | A |
| Suitability for gasket | Suitable | Suitable | Unsuitable | Unsuitable | Unsuitable | Unsuitable | Suitable | Unsuitable | Unsuitable | Unsuitable | Unsuitable |

|  | Comparative Example 17 | Comparative Example 18 | Comparative Example 19 | Comparative Example 20 | Comparative Example 21 | Comparative Example 22 | Comparative Example 23 | Comparative Example 24 |
|---|---|---|---|---|---|---|---|---|
| EAO-4 | 100 |  |  |  |  |  | 80 | 90 |
| EAO-3 |  | 100 |  |  | 80 | 95 |  |  |
| SBC-3 |  |  | 100 |  |  |  | 20 | 10 |
| TPU-1 |  |  |  |  | 20 | 5 |  |  |
| EVA-1 |  |  |  | 100 |  |  |  |  |
| MI (190° C., 5 kg) | 30.0 | 10.0 | 1.0 | 15.0 | 8.0 | 9.0 | 25.0 | 27.0 |

TABLE 1-continued

| | | | | | | | | |
|---|---|---|---|---|---|---|---|---|
| Hardness (Shore A) | 65 | 70 | 75 | 75 | 74 | 72 | 69 | 67 |
| Extrusion workability | E | A | E | E | A | A | D | D |
| Surface stickiness | A | A | A | B | A | A | A | A |
| Elasticity | A | D | A | D | A | C | A | A |
| Shape retention | C | C | A | C | A | C | B | C |
| Corner adhesiveness | C | A | E | D | A | A | B | B |
| Surface smoothness | A | A | E | A | A | A | B | A |
| Hydrolysis resistance | A | A | A | A | D | B | A | A |
| UV discoloration resistance | A | A | A | A | E | B | A | A |
| Suitability for gasket | Unsuitable | Unsuitable | Unsuitable | Unsuitable | Unsuitable | Unsuitable | Unsuitable | Unsuitable |

| | Example 8 | Example 9 | Example 10 | Example 11 | Example 12 | Example 13 | Comparative Example 25 | Comparative Example 26 | Comparative Example 27 |
|---|---|---|---|---|---|---|---|---|---|
| EAO-4 | | | 40 | 20 | 45 | 15 | 5 | 45 | 75 |
| EAO-3 | 80 | 90 | 40 | 60 | 45 | 75 | 10 | 50 | 15 |
| SBC-3 | 20 | 10 | 20 | 20 | 10 | 10 | 85 | 5 | 10 |
| TPU-1 | | | | | | | | | |
| EVA-1 | | | | | | | | | |
| MI (190° C., 5 kg) | 8.0 | 9.0 | 13.0 | 10.0 | 14.0 | 9.0 | 1.5 | 17 | 20.0 |
| Hardness (Shore A) | 71 | 72 | 70 | 71 | 71 | 71 | 74 | 70 | 68 |
| Extrusion workability | B | A | B | A | A | A | D | B | D |
| Surface stickiness | A | A | A | A | A | A | A | B | A |
| Elasticity | B | B | A | A | A | A | A | A | A |
| Shape retention | A | B | B | A | B | A | A | C | C |
| Corner adhesiveness | B | B | B | A | B | A | D | B | B |
| Surface smoothness | B | A | A | A | A | A | D | B | A |
| Hydrolysis resistance | A | A | A | A | A | A | A | A | A |
| UV discoloration resistance | A | A | A | A | A | A | A | A | A |
| Suitability for gasket | Suitable | Suitable | Suitable | Suitable | Suitable | Suitable | Unsuitable | Unsuitable | Unsuitable |

A: Excellent,
B: Good,
C: Fair,
D: Poor,
E: Very poor

Referring to the results in Table 1, the refrigerator gaskets produced by profile extrusion of the compositions of Examples 1-13, each including the blend of the OAO and SBC as a polymer base, exhibit excellent extrusion workability, surface characteristics, shape retention, and corner adhesiveness. Due to these advantages, the compositions of Examples 1-13 are very suitable as gasket materials. In contrast, the compositions, each including the blend of the OAO having a melting point lower than 100° C. and the SBC as a polymer base, but having a melt index (190° C., 5 kg) exceeding 15 g/10 min, exhibit inferior extrusion workability.

The compositions of Examples 10-13 exhibit good elasticity due to the use of a combination of the ORC and OBC as the OAC.

The refrigerator gaskets produced from the compositions of Examples 1-13 are not hydrolyzed when they come into contact with moisture from foods stored in refrigerators. In addition, since the refrigerator gaskets do not undergo yellowing by UV, their elasticity and shape can be maintained.

The foregoing embodiments have been described for illustrative purposes. Accordingly, those skilled in the art will appreciate that various modifications are possible, without departing from the scope and spirit of the present disclosure. The disclosed embodiments do not serve to limit the spirit of the present disclosure. The true spirit and scope of the present disclosure will be defined by the claims that follow.

What is claimed is:

1. A refrigerator gasket prepared by a profile extrusion, comprising:
   as a polymer base, a blend of an olefin/α-olefin (OAO) copolymer and a styrene block copolymer (SBC),
   wherein the polymer base has a melt index (190° C., 5 kg) of 0.01 to 15 g/10 min and a Shore A hardness of 60 to 80, wherein the weight ratio of the olefin/α-olefin copolymer to the styrene block copolymer is from 10:90 to 90:10,
wherein the olefin/α-olefin copolymer is a combination of an olefin random copolymer (ORC) and an olefin block copolymer (OBC).

2. The refrigerator gasket according to claim 1, further comprising a magnet therein.

3. The refrigerator gasket according to claim 1, wherein the olefin/α-olefin copolymer is a copolymer of ethylene or propylene and octene.

* * * * *